Feb. 9, 1971　　　　　J. R. TAVIS　　　　　3,562,687
VARIABLE-RELUCTANCE TRANSDUCER AND MAGNETIC CORE
Filed June 23, 1969　　　　　　　　　　　3 Sheets-Sheet 1
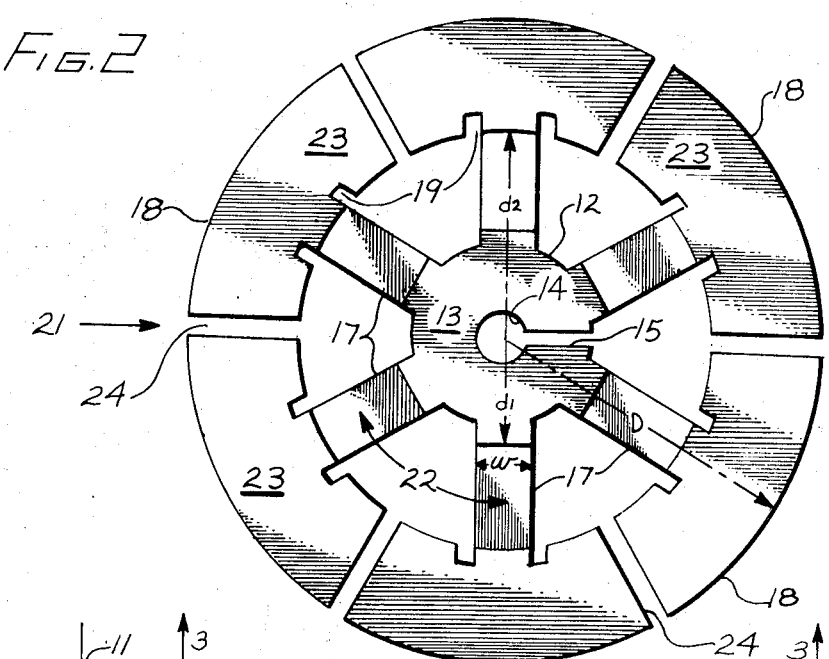
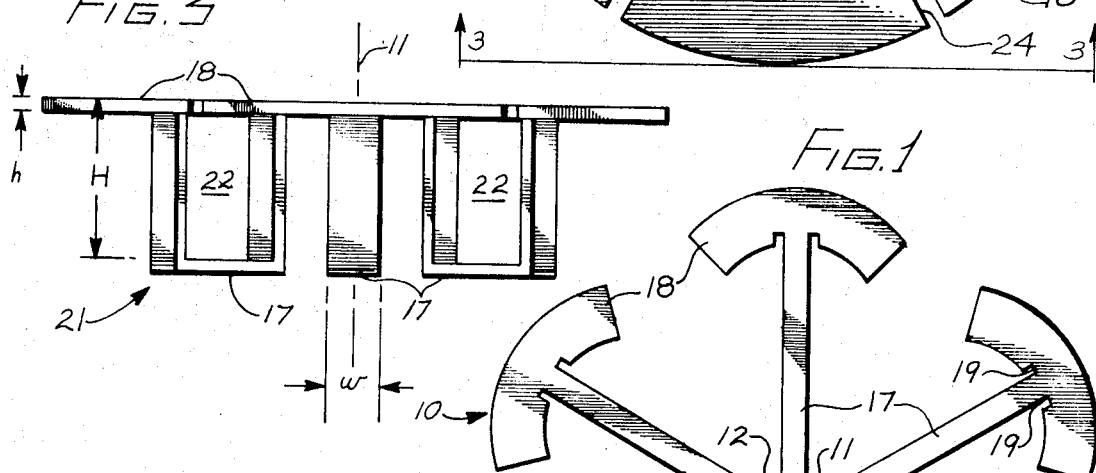
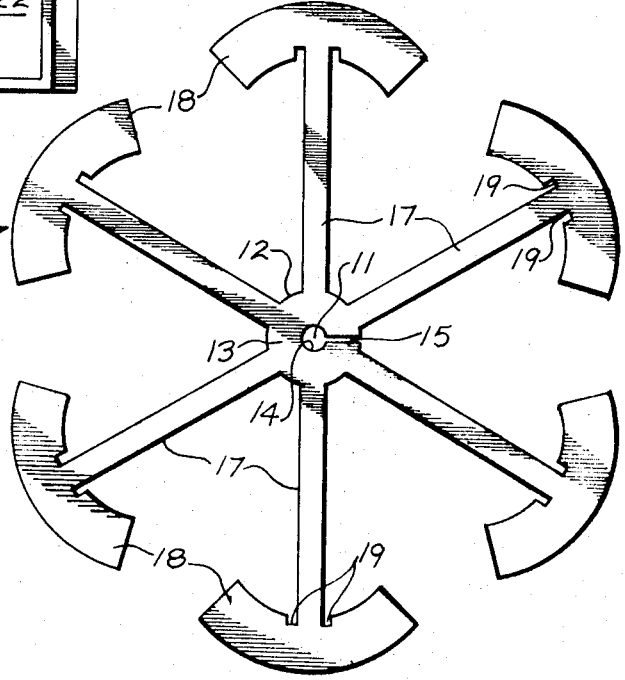
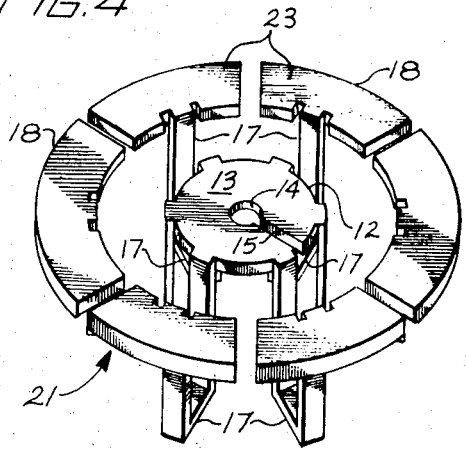
INVENTOR.
JOHN R. TAVIS
BY
*Christie, Parker & Hale*
ATTORNEYS Feb. 9, 1971  J. R. TAVIS  3,562,687
VARIABLE-RELUCTANCE TRANSDUCER AND MAGNETIC CORE
Filed June 23, 1969  3 Sheets-Sheet 2
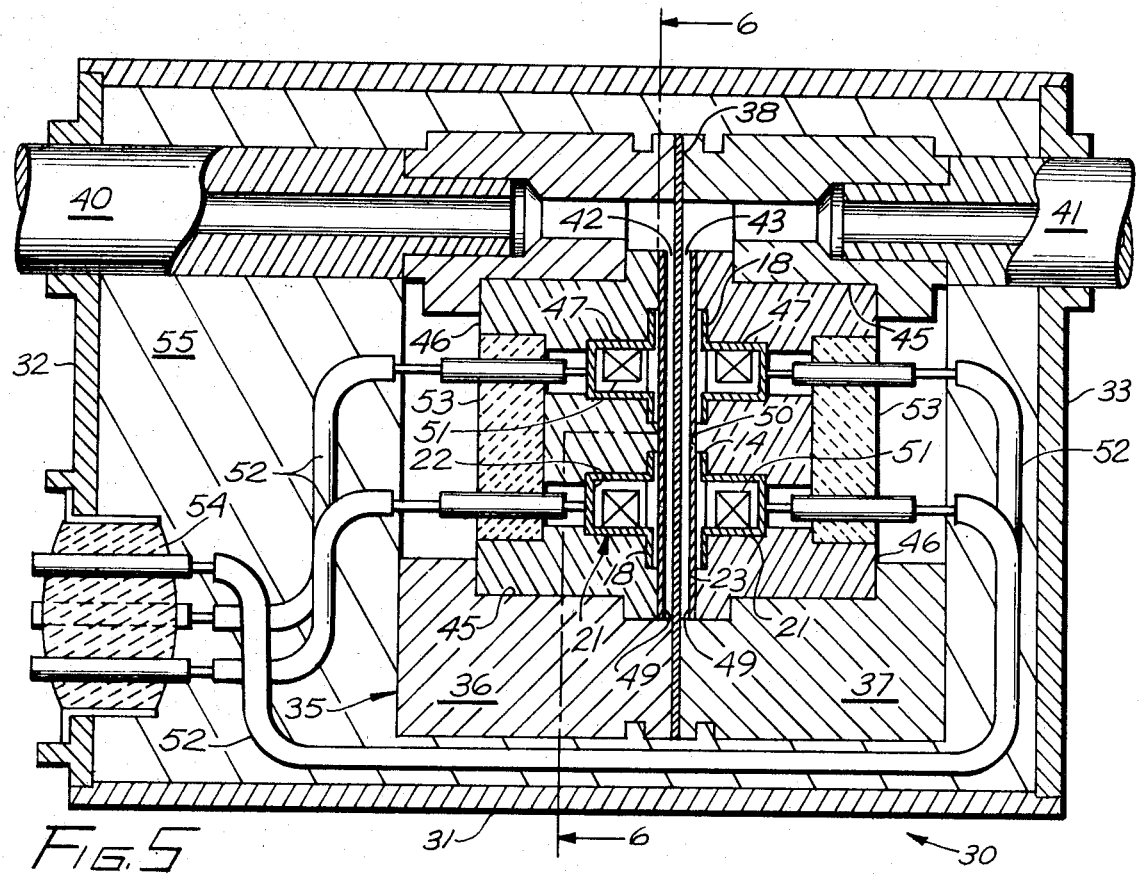
FIG.5
FIG.7
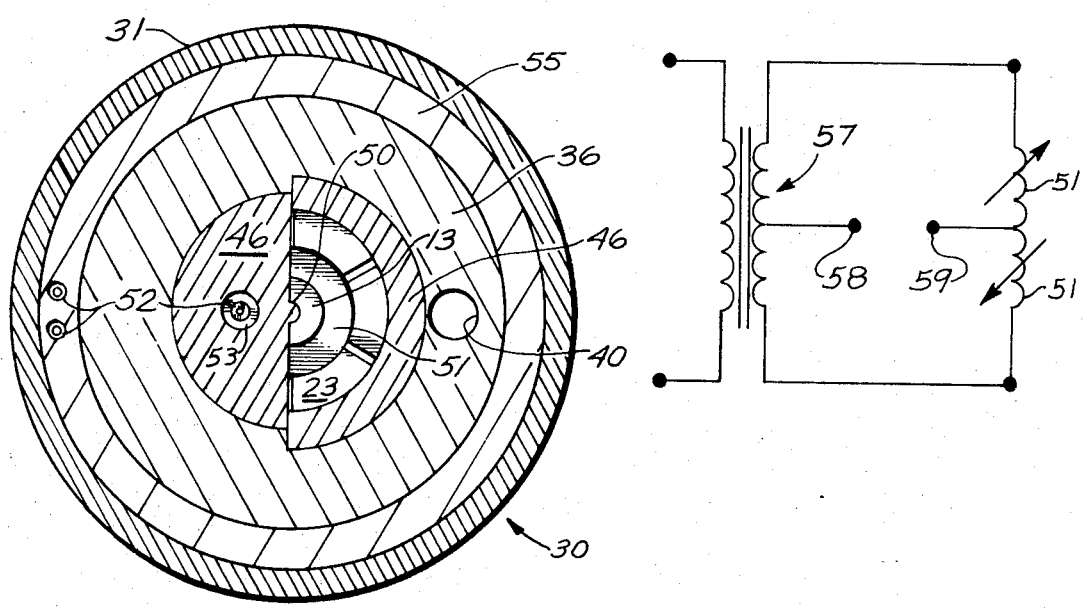
FIG.6

Feb. 9, 1971 J. R. TAVIS 3,562,687
VARIABLE-RELUCTANCE TRANSDUCER AND MAGNETIC CORE
Filed June 23, 1969 3 Sheets-Sheet 3

United States Patent Office 3,562,687
Patented Feb. 9, 1971

3,562,687
VARIABLE-RELUCTANCE TRANSDUCER AND MAGNETIC CORE
John R. Tavis, Mariposa, Calif., assignor, by mesne assignments, to Tavis Corporation, Mariposa, Calif., a corporation of California
Filed June 23, 1969, Ser. No. 835,522
Int. Cl. H01j 21/02
U.S. Cl. 336—30                                    10 Claims

ABSTRACT OF THE DISCLOSURE

A magnetic core for a variable-reluctance transducer, and having a geometry which minimizes leakage magnetic flux for improved transducer sensitivity and linearity. Slender spaced-apart legs extend radially from a center pole to define a U-shaped channel in which an energizing coil is fitted. Enlarged arcuate tabs extend laterally from the ends of the legs to form a segmented outer pole of the core. When assembled in a transducer adjacent a movable armature spaced therefrom by a variable air gap, the core has very low iron-path reluctance, and an air-gap reluctance which is substantially lower than the leakage-path reluctance.

BACKGROUND OF THE INVENTION

Variable-reluctance transducers have been used for many years for measuring pressure, acceleration, and other physical parameters. The parameter being measured is sensed by a mechanical armature such as a force-summing diaphragm in a pressure transducer or a seismic mass in an accelerometer. Variations in the physical parameter move the armature which in turn varies the magnetic reluctance of a magnetic circuit in the transducer. Reluctance variations produce changes in the inductance of a coil in the magnetic circuit, and the inductance variations are sensed in a bridge circuit or similar arrangement to provide an electrical output signal which is analogous to the magnitude of the physical parameter.

The transducer coil is wound around a core of magnetic material, and a magnetic field exists between spaced pole faces of the core when current flows through the coil. The diaphragm (or other sensing device) is slightly spaced from the pole faces, and provides a low-reluctance path for the magnetic field between the pole faces. Motion of the diaphragm varies the reluctance of the magnetic path to vary the coil inductance and the transducer output signal. An example of this type of variable-reluctance transducer is shown in U.S. Pat. No. 3,118,121 issued Jan. 14, 1964.

The reluctance of the complete magnetic circuit can be analyzed in terms of three separate components. The circuit portion of lowest reluctance is the iron path defined by the core and diaphragm. A second and variable reluctance is defined by the variable air gap between the diaphragm (or other armature member) and the core pole faces. Finally, several leakage-flux paths exist in the magnetic circuit, and the reluctances of these paths can be approximately determined from the geometry of the circuit. The leakage-flux paths of major interest are from the pole faces to the sides and bottom of an annular coil-receiving channel within the magnetic core.

I have found that the ratio of core leakage-path reluctance to air-gap reluctance is a critical factor in determining sensitivity and linearity of the overall transducer. If this ratio could be made to approach infinity, the transducer output signal would respond linearly to variations in the parameter being measured, and sensitivity (in terms of output-signal voltage per volt input to the bridge circuit) would be one-half the per-unit change in the gap as the armature or diaphragm is moved. If the ratio is about unity, as it is in typical commercially available variable-reluctance transducers, a linearity error (arising from only the leakage-flux reluctance) of about ±0.4% of full-scale output occurs at about 60% of full scale, and sensitivity is degraded to about one-fourth the per-unit change in air gap.

I have determined that an improvement of about 50% or more in sensitivity and linearity error can be achieved by increasing the ratio of leakage-flux reluctance to air-gap reluctance from unity to about three or more. Superior cores having these characteristics are made by following these design guidelines:

(a) Eliminate all unnecessary iron from the core structure to minimize leakage-flux area. This is accomplished by forming the core with narrow legs extending from a center pole to define a segmented or apertured coil-receiving channel. Enlarged arcuate tabs at the ends of the legs are bent into plane of the center pole face to define a segmented annular outer pole.
(b) Optimize the depth of the coil-receiving channel to minimize leakage flux. The leakage-flux paths should ba as long as posible.
(c) Minimize the air gap, and make air-gap pole faces as large as possible within the limits of overall package size.
(d) Use a core material having very high magnetic permeability to minimize reluctance of the iron path.

The core herein disclosed satisfies these requirements and makes possible a marked improvement in transducer sensitivity and linearity.

SUMMARY OF THE INVENTION

Briefly stated, the invention comprises a magnetic core which is formed generally symmetrically about a central axis, the core having a center pole extending radially from the central axis and defining a center pole face. A plurality of narrow legs are secured to and extend from the center pole to define a generally U-shaped segmented annular channel adapted to receive a coil, the legs being uniformly angularly spaced apart around the center pole to define gaps therebetween. An enlarged tab is formed at the end of each leg to extend laterally therefrom. The tabs are bent to extend substantially perpendicularly to the central axis to define an outer pole face substantially coplanar with the center pole face. The outer pole face is divided into sectors by gaps between adjacent tabs, the tab gaps being substantially smaller than the leg gaps.

Preferably, the center pole face is substantially circular, and the tabs are arcuate whereby the outer pole face is a segmented annulus disposed around and spaced from the center pole face. The diameter of the center pole is preferably about one-third the outside diameter of the outer pole face, and the inside diameter of the outer pole face is preferably about two-thirds its outside diameter. The depth of the U-shaped coil-receiving channel is preferably in the range of about 15% to about 30% of the outside diameter of the outer pole face.

The core is useful in variable-reluctance transducers for measuring physical parameters such as pressure. The core is preferably positioned within such a transducer to be surrounded by two separate walls of magnetic shielding material. The core is mounted within the shielding walls on a supporting member made of non-magnetic material which does not degrade the desired high reluctance of the leakage-flux paths in the core.

BRIEF DESCRIPTION OF THE DRAWINGS

FIG. 1 is a plan view of a sheet-metal blank from which a magnetic core according to the invention is to be formed;

FIG. 2 is an enlarged plan view of a core formed from the blank shown in FIG. 1;

FIG. 3 is a side elevation of the core on line 3—3 of FIG. 2;

FIG. 4 is a perspective view of the core;

FIG. 5 is a sectional elevation of a variable-reluctance transducer incorporating two cores of the type shown in FIGS. 2–4;

FIG. 6 is a reduced-scale stepped section taken on line 6—6 of FIG. 5;

FIG. 7 is a schematic diagram showing the electrical connection of coils associated with the cores;

DESCRIPTION OF THE PREFERRED EMBODIMENTS

Figure 8:
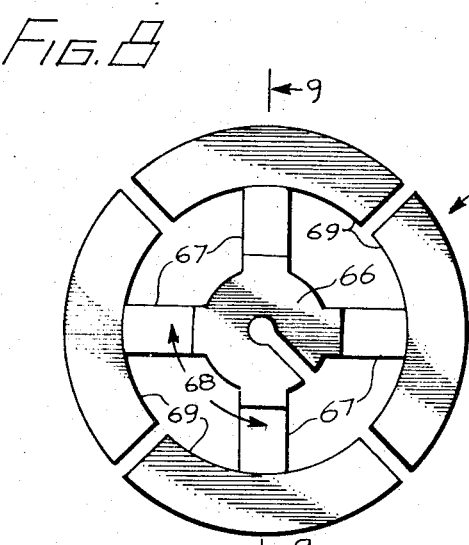
FIG. 8 is a plan view of a first alternative embodiment of the core.

A flat blank 10 suitable for forming a magnetic core according to the invention is shown in FIG. 1. Blank 10 is made of a material such as Mu metal which has a very high magnetic permeability. The blank is relatively thin, and typically has a thickness of about 0.006 inch.

Blank 10 is symmetrically formed around a central axis 11 (seen end-on in FIG. 1), and has a central disk defining a center pole 12 of the core. The upper surface of the center pole defines a center pole face 13. A hole 14 is centrally formed through center pole 12, and a slot 15 extends from the hole to the edge of the center pole. Hole 14 is used to position and mount the core in a transducer as described below, and slot 15 is useful in reducing eddy-current losses in the center pole.

A plurality of legs 17 radiate outwardly from the center pole, and are uniformly spaced apart around the periphery of the pole. The legs are made as narrow as possible to reduce leakage flux in the core, but must have sufficient cross sectional area to conduct rated magnetic flux without saturating. In a typical unit, each leg has a width of about 0.020 inch.

An enlarged arcuate tab 18 is formed at the end of each leg 17, and the tab extends laterally from each side of the leg. Each tab is shaped as an annular sector with inner and outer edges centered on central axis 11 after the blank is formed into a core as shown in FIGS. 2–4. Shallow notches 19 are formed in each tab on opposite sides of leg 17 to facilitate bending of the tab when the core is formed.

Referring to FIGS. 2–4, a magnetic core 21 is formed from blank 10 by first bending each leg 17 to extend perpendicularly downwardly away from center pole face 13 and parallel to central axis 11. A second right-angle bend is formed in each leg so the leg extends radially away from the central axis, and a third right-angle bend is formed so the end of the leg extends downwardly parallel to the central axis and perpendicular to the plane of the center pole face. Finally, each tab 18 is bent downwardly into the plane of the center pole face to extend around and radially outwardly from the central axis.

When the legs are bent as just described, they define a segmented or windowed U-shaped coil-receiving channel 22 extending around the central axis beneath the plane of the center pole face. The channel has an outside diameter $d_1$ and an inside diameter $d_2$ as shown in FIG. 2. Tabs 18 define a segmented outer pole face 23 which is coplanar with center pole face 13 and has an outside diameter D. The outer pole face is interrupted by gaps 24 between adjacent tabs 18 to reduce eddy-current losses in the outer pole. In FIGS. 2 and 3, the depth of coil-receiving channel 22 is H, the thickness of the core-forming material is $h$, and the width of legs 17 is $w$.

I have found that the performance of the core is optimized by making the area of the outer pole about five times the area of the center pole. The center-pole diameter is preferably about one-third the outside diameter of the outer pole or $D/3$. The desired difference in pole area is achieved by letting $$d_2 = \frac{2D}{3}$$

Defining W as the summation of widths $w$ of the core legs, W and $h$ should be made as small as possible to minimize eddy-current and leakage-flux losses, while still providing a sufficient cross section to avoid saturation (for the specific field strength for which the core is designed) and excessive iron-path reluctance.

Channel depth H must be optimized to reduce eddy-current and leakage-flux losses within the core, and its value is dependent on W and outer diameter D. The following analytically determined values (based on a full-scale diaphragm deflection which is about 20% of the nominal core-diaphragm air gap) have been found to provide a core with low losses:

| $\frac{H}{D}$ | $\frac{W}{D}$ |
|---|---|
| 0.25 | 0.25 |
| 0.2 | 0.50 |
| 0.18 | 0.75 |
| 0.17 | 1.0 |

NOTE.—($W=\Sigma w$).

Once the values of D and $w$ are determined (based on physical package size and flux-carrying capability) depth H is quickly ascertained from this table.

For example, a core of superior performance has been made from a magnetic material having a permeability of about 5,000, with $D=0.375$ inch, $w=0.020$ inch and $h=0.006$ inch. This core has six legs extending between the center and outer poles, and W is accordingly $6 \times 0.020$ inch or 0.120 inch. H is then determined from the above table to be about 0.08 to 0.09 inch. Assuming a nominal armature air gap of about 0.008 inch, this core has an iron-path reluctance of about 0.026, an air-gap reluctance of about 0.317, and a leakage-path reluctance of about 0.89. This results in a ratio of leakage-path reluctance to air-gap reluctance of about 2.8 which is several times better than known units and results in a marked improvement in sensitivity and linearity when the core is installed on a core-support member in a variable-reluctance transducer.

A variable-reluctance pressure transducer 30 incorporating a pair of cores 21 is shown in FIGS. 5 and 6. The transducer is housed in a cylindrical case 31 which is closed at opposite ends by a pair of end plates 32 and 33 secured thereto. The case and end plates are made of a magnetic material such as 410 stainless steel which provides shielding for the transducer.

A diaphragm housing 35 is dispoed within the transducer case, and includes a pair of cylindrical mounting blocks 36 and 37 between which is sandwiched a thin flexible diaphragm 38 of a magnetic material such as 410 stainless steel. These components are welded together at the periphery of the diaphragm, and the blocks are preferably also made of a magnetic material such as 410 stainless steel to provide additional shielding for the magnetic circuit. The case, diaphragm and mounting blocks are preferably made of the same magnetic material, or of magnetic materials which have essentially equal thermal expansion characteristics to provide stability in environments of varying temperature.

A pair of pressure-inlet tubes 40 and 41 extend through end plates 32 and 33 respectively, and the tubes are secured to the diaphragm mounting blocks to open into chambers 42 and 43 on opposite sides of diaphragm 38. The two inlet tubes are necessary if the transducer is used for measuring differential pressures, but one tube can be eliminated if gage or absolute pressures are being measured. Tubes 40 and 41 are preferably made of a nonmagnetic alloy such as Inconel or Monel.

Blocks 36 and 37 each have a central bore 45, and a pair of core-support members 46 are seated and secured in the bores on opposite sides of the diaphragm. Each core-support member has an annular channel 47 in which a magnetic core 21 is seated and spot welded in place. Outer pole face 23 of the core is recessed slightly beneath the surface of core-support member 46 which faces the diaphragm, and a thin cover plate 49 is welded to this surface and to a pin 50 which extends from member 46 through hole 14 of the core. The cover plate extends over the core to isolate the core from the gas or liquid media introduced into chambers 42 and 43 through the pressure-inlet tubes. Core-support members 46 and cover plates 49 are made of a non-magnetic high-resistivity alloy such as Inconel or Monel. Non-magnetic stainless steels in the 300 series are also suitable materials for these parts. The use of non-magnetic material is preferred to avoid shunting low-reluctance paths for the core magnetic field which would decrease the desired high leakage-flux reluctance of the core.

An energizing coil 51 is seated in channel 22 of each core 21, and is cemented or otherwise secured in place. Electrical connections to the coil are made by wires 52 extending through ceramic insulators 53 seated in the bases of members 46. Wires 52 extend out of the transducer case through a ceramic insulator 54 mounted in end plate 32. The interior of the transducer case is filled with a conventional potting material 55.

The electrical connection of the transducer is shown in FIG. 7. Coils 51 are connected in series across the output of a carrier-oscillator output transformer 57 which has a center-tap terminal 58. The input voltage to the transducer is applied across the series-connected coils, and the transducer output voltage appears between center-tap terminal 58 and a terminal 59 at the point of series connection of the two coils. This type of circuit is conventional with variable-reluctance transducers, and need not be described in further detail.

Pressure transducer 30 is only one example of a transducer in which the magnetic cores of this invention are useful, but it is a particularly advantageous design due to the double magnetic shielding afforded by the outer case and diaphragm mounting blocks. The superior performance and low-leakage flux of cores 21 provide a transducer with improved sensitivity and linearity. These cores are also characterized by low-eddy current losses, permitting excitation of the transducer by relatively high-frequency carrier voltages in the range of 10 to 50 kilocycles.

Figure 9:
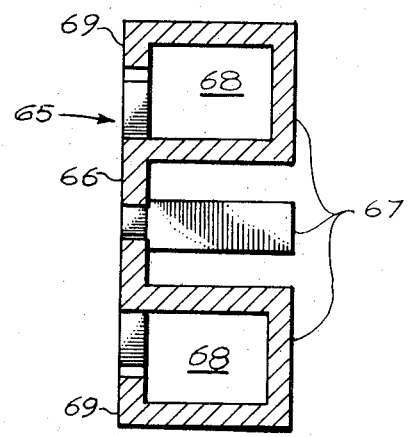
FIG. 9 is a sectional view on line 9—9 of FIG. 8.

The magnetic core of this invention is not limited to the specific configuration shown in FIGS. 1–4, and a first alternative core 65 is shown in FIGS. 8–9. This core is generally similar to core 21 in that it includes a slotted center pole 66, but only four U-shaped legs 67 are used to define a segmented coil-receiving channel 68. A tab 69 extends laterally from the end of each leg 67, and is bent inwardly toward the center pole face. Tabs 69 extend around the center pole face to define a segmented outer pole face of the core. This design has somewhat lower leakage flux than core 21, but is more difficult to manufacture due to the inward bending of the tabs.

Figure 10:
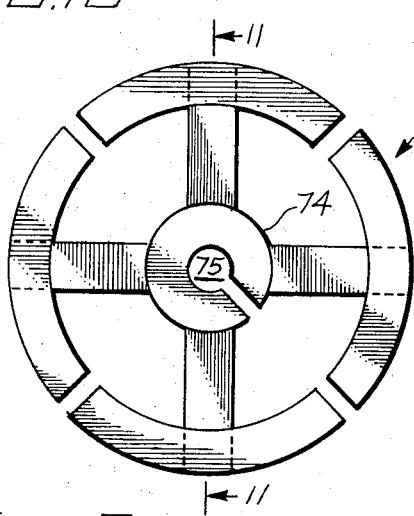
FIG. 10 is a plan view of a second alternative embodiment of the core.
Figure 11:
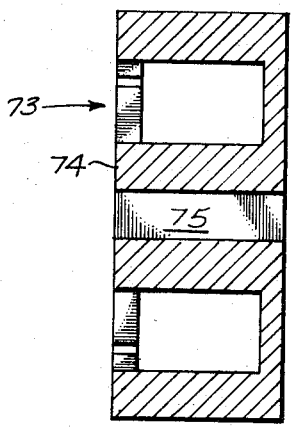
FIG. 11 is a sectional view on line 11—11 of FIG. 10.

A second alternative embodiment of the invention is shown in FIGS. 10–11 which illustrate a cast or machined core 73 having a cylindrical center pole 74. A slotted bore or keyhole-shaped opening 75 extends through the length of the center pole to reduce eddy-current losses or is otherwise generally similar to core 65 described above. The cast or machined core is primarily useful with relatively low excitation frequencies.

Figure 12:
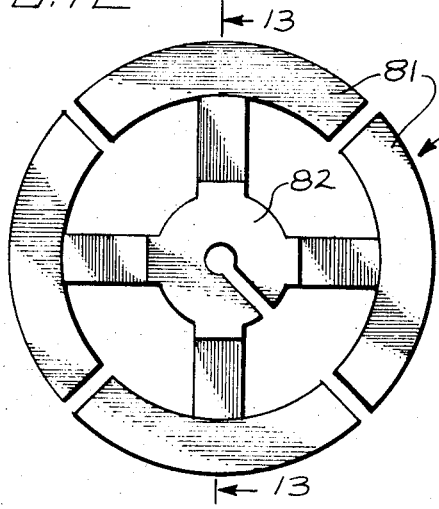
FIG. 12 is a plan view of a third alternative embodiment of the core.
Figure 13:
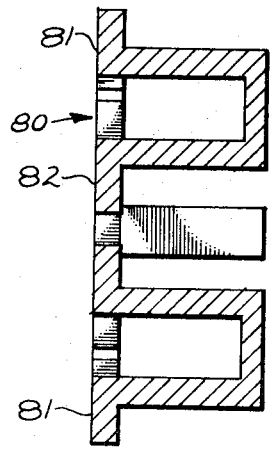
FIG. 13 is a sectional view on line 13—13 of FIG. 12.

A third alternative embodiment of the invention is illustrated in FIGS. 12–13 showing a sheet-metal core 80. This core is generally similar to core 65, with the exception that it includes outer-pole-face tabs 81 which are bent outwardly away from an inner pole face 82. This design has slightly higher leakage flux than a core 65 of the same outside diameter, but is easier to manufacture.

The cores of this invention are characterized by a plurality of slender legs which extend between the inner and outer pole faces to define a coil-receiving channel. Enlarged arcuate tabs at the ends of the legs define a segmented outer pole face of substantially larger area than the center pole face. The apertured or windowed coil-receiving channel which is characteristic of this construction minimizes leakage magnetic flux, and provides improved linearity and sensitivity in variable-reluctance transducers useful at high carrier frequencies.

What is claimed is:

1. A magnetic core formed about a central axis and comprising:
   a center pole extending radially from the central axis and defining a center pole face;
   a plurality of legs secured to and extending from the center pole to define a generally U-shaped segmented annular channel adapted to receive a coil, the legs being spaced apart around the center pole to define gaps therebetween; and
   an enlarged tab extending laterally from the end of each leg, the tabs defining an outer pole face substantially coplanar with the center pole face, the outer pole face being divided into sectors by gaps between adjacent tabs, the tab gaps being substantially smaller than the leg gaps.

2. The core defined in claim 1 in which the center pole face is substantially circular and the tabs are arcuate so the outer pole face is a segmented annulus.

3. The core defined in claim 2 in which the diameter of the center pole is about one-third the outside diameter of the outer pole face, and the inside diameter of the outer pole face is about two-thirds its outside diameter.

4. The core defined in claim 3 in which the depth of the U-shaped annular channel is in the range of about 15% to about 30% of the outside diameter of the outer pole face.

5. The core defined in claim 4 in which the center pole is a cylindrical body extending from the center pole face to the bottom of the U-shaped annular channel, the core being formed from a single piece of high permeability material.

6. The core defined in claim 4 in which the center pole is substantially disk shaped, and each leg extends first generally parallel to the central axis and away from the plane of the pole faces to join a leg portion extending radially outwardly from the central axis, the radially extending portion in turn joining another leg portion extending back toward the pole-face plane to terminate in the enlarged tab.

7. A variable-reluctance pressure transducer comprising:
   a case;
   a diaphragm housing supported within the case;
   a magnetically conductive diaphragm supported within the housing and deflectable in response to differential pressure thereacross;
   a core-support member mounted on the housing adjacent the diaphragm;
   a magnetic core mounted on the core-support member and formed generally symmetrically about a central axis, the core including a center pole extending radially from the central axis and defining a center pole face, a plurality of legs secured to and extending from the center pole to define a generally U-shaped segmented annular channel adapted to receive a coil, the legs being spaced apart around the center pole to define gaps therebetween, and an enlarged tab extending laterally from the end of each leg, the tabs defining an outer pole face substantially coplanar with the center pole face, the outer pole face being divided into sectors by gaps between adjacent tabs, the tab gaps being substantially smaller than the leg gaps; and a coil secured in the core channel.

8. The transducer defined in claim 7 in which the center pole face is substantially circular to the tabs are arcuate so the outer pole face is a segmented annulus, the center pole having a diameter of about one-third the outside diameter of the outer pole face, and the inside diameter of the outer pole face being about two-thirds its outside diameter, the U-shaped annular channel having a depth which is in the range of about 15% to about 30% of the outside diameter of the outer pole face.

9. The transducer defined in claim 8 in which the core-support member is formed of a non-magnetic material.

10. The transducer defined in claim 9 in which the case and diaphragm housing are formed of magnetically conductive material.

References Cited

UNITED STATES PATENTS 3,302,099   1/1967   Packard _____ 336—30

ELLIOT A. GOLDBERG, Primary Examiner

U.S Cl. X.R.

336—233

PO-1050
(5/69)

UNITED STATES PATENT OFFICE
CERTIFICATE OF CORRECTION

Patent No. 3,562,687      Dated February 9, 1971

Inventor(s) _____

It is certified that error appears in the above-identified patent and that said Letters Patent are hereby corrected as shown below:

Column 2, line 20, after "into" insert --the--.
Column 4, line 60, "dispoed" should read --disposed--.
Column 7, line 9, claim 8, "to" should read --and--.

Column 3, line 69, "outside" should read --inside--;
line 70, "inside" should read --outside--.

Signed and sealed this 20th day of July 1971.

(SEAL)
Attest:

EDWARD M. FLETCHER, JR.
Attesting Officer

WILLIAM E. SCHUYLER, JR.
Commissioner of Patents